United States Patent
Lee

(10) Patent No.: US 8,762,393 B2
(45) Date of Patent: *Jun. 24, 2014

(54) METHOD AND SYSTEM OF CLUSTERING FOR MULTI-DIMENSIONAL DATA STREAMS

(75) Inventor: Wong Suk Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 115 days.

This patent is subject to a terminal disclaimer.

(21) Appl. No.: 12/564,343

(22) Filed: Sep. 22, 2009

(65) Prior Publication Data

US 2010/0106723 A1    Apr. 29, 2010

(30) Foreign Application Priority Data

Oct. 24, 2008 (KR) .................. 10-2008-0104741

(51) Int. Cl.
*G06F 7/00* (2006.01)
*G06F 17/00* (2006.01)
*G06F 17/30* (2006.01)

(52) U.S. Cl.
USPC ............... 707/750; 707/730; 707/747

(58) Field of Classification Search
USPC .......... 707/737, 899; 382/155; 702/179; 345/424
See application file for complete search history.

(56) References Cited

U.S. PATENT DOCUMENTS

| 5,799,300 | A  | * | 8/1998  | Agrawal et al. ............ 1/1 |
| 6,003,029 | A  | * | 12/1999 | Agrawal et al. ............ 1/1 |
| 6,460,026 | B1 | * | 10/2002 | Pasumansky .......... 707/737 |
| 6,628,821 | B1 | * | 9/2003  | Covell et al. ......... 382/155 |
| 7,565,346 | B2 | * | 7/2009  | Fan et al. ................. 1/1 |
| 7,991,578 | B2 | * | 8/2011  | Lee ................... 702/179 |
| 2009/0322748 | A1 | * | 12/2009 | Chen et al. ......... 345/424 |

OTHER PUBLICATIONS

Jae Woo Lee, "Efficiently Tracing Clusters over High-Dimensional On-Line Data Stream", The Graduate School Yonsei University Department of Computer Science, Aug. 2008.

* cited by examiner

*Primary Examiner* — Susan Chen

(57) ABSTRACT

A method for clustering multi-dimensional data streams includes: when data elements are input, determining 1-D subclusters and assigning identifiers to the determined 1-D subclusters; (b) generating a matching set that is a set of identifiers of the 1-D subclusters where each dimensional value of the data elements belongs to the range of the 1-D subclusters of the corresponding dimensions; and (c) determining subclusters by finding a set of frequently co-occurring 1-D subclusters among a set of 1-D subclusters that belong to the generated matching set. With the present invention, the processing time required to find the subclusters can be improved and the performance of the memory is further improved.

26 Claims, 9 Drawing Sheets

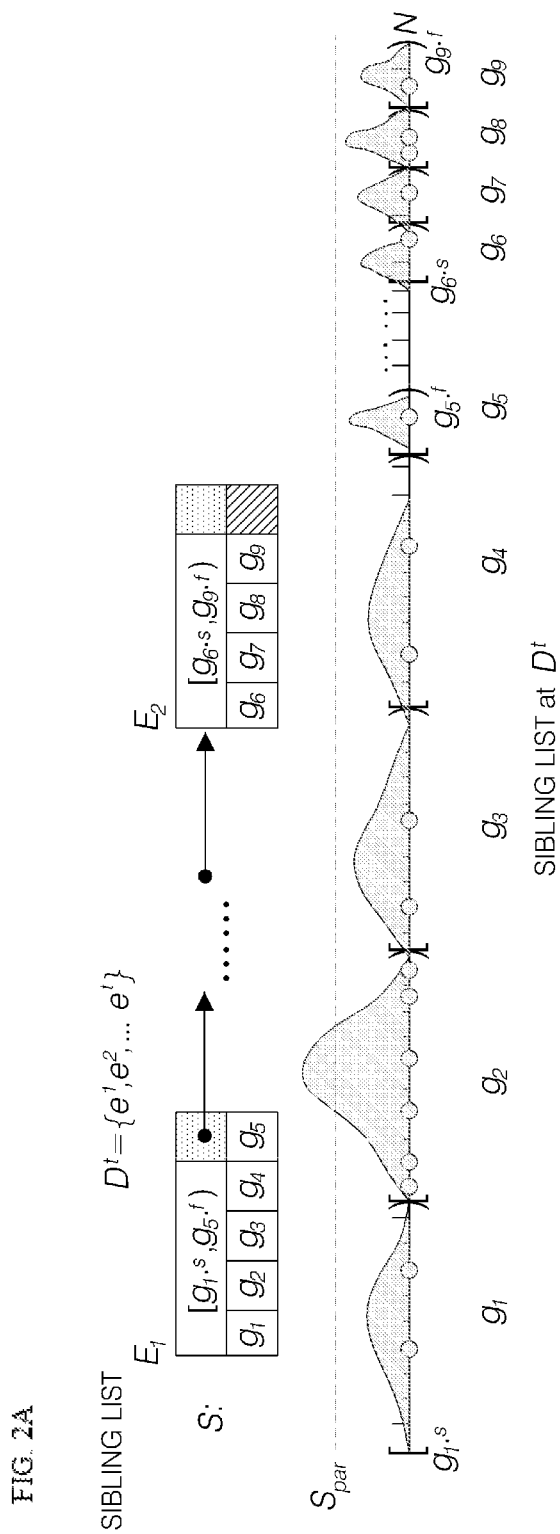

FIG. 5

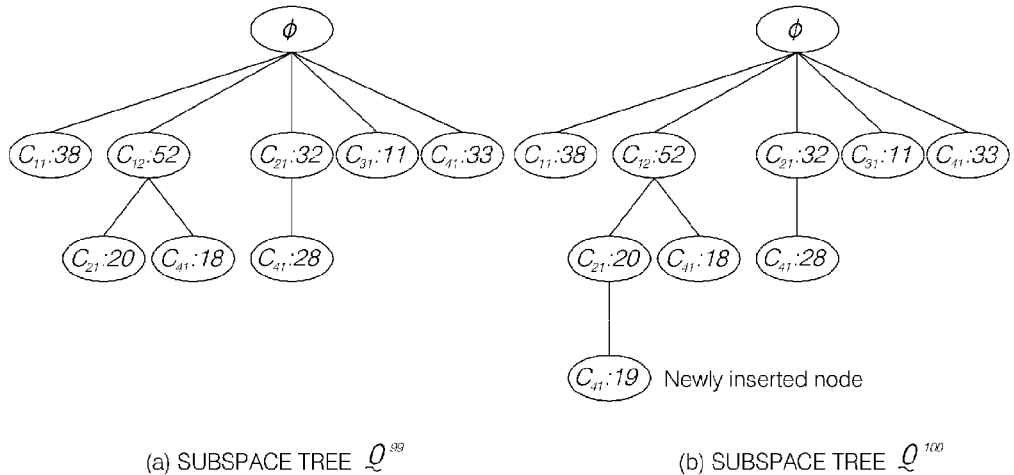

(a) SUBSPACE TREE $Q^{99}$    (b) SUBSPACE TREE $Q^{100}$

FIG. 6

| Function 1D_clustering($e^t$) |
|---|
| Input  $e^t$ : a newly generated data element<br>Output  $MS(e^t)$: a matching set<br>    $S_k$ : a sibling list for the dimension $N_k$<br>    $S_{par}$: a partitioning threshold<br>    $S_{mer}$: a merging threshold |
| 1:  $MS(e^t) = \phi$<br>2:  for $k=1$ to $d$ {              /* updating phase */<br>3:    find a grid-cell $S_k.E.G[i]$ whose interval includes $e_k^t$ i.e. $S_k.E.G[i].I \ni e_k^t$;<br>4:    update the distribution statistics of $S_k.E.G[i]$;<br>5:    if ($S_k.E.G[i].c^t/|D^t| \geq S_{par}$ and $|S_k.E.G[i].I| > \lambda$)  /* partitioning phase */<br>6:      partition $n.E.G[i]$ into $g_1^k, \ldots, g_s^k$;<br>7:    else if ($S_k.E.G[i].c^t/|D^t| \leq S_{mer}$)           /* merging phase */<br>9:      merge $n.E.G[i]$ with the sparse grid-cells consecutive to it ;<br>10:   if ($S_k.E.G[i].c^t/|D^t| \geq S_{mfs}$ and $|S_k.E.G[i].I| == \lambda$)<br>11:     $MS(e^t) = MS(e^t) \cup \{S_k.E.G[i].cid\}$<br>12: } |

FIG. 7

| |
|---|
| Function ND_clustering($MS(e^t)$, $e^t$) |
| Input $MS(e^t)$: a matching set |
| Output $L^t$: a set of currently identified subclusters |
|     $Q^t$: an ST-tree |
| 1:  for all prefix subset $u$ s.t. $u \in (2^{MS(e^t)} - \{\phi\})$ and $u \in Q^t$ { /* updating phase */ |
| 2:    $Q^t.u.count^t$++ |
| 3:    update the rectangular space synopsis $Q^t.u.RSS$ |
| 4:    if ($Q^t.u.count^t/|D^t| < S_{sig}$ and $|u| > 1$)   // Pruning |
| 5:      Eliminate $u$ and all of its descendent nodes from $Q^t$ |
| 6:  } |
| 7:  $\overline{MS(e^t)} = \emptyset$                         /* inserting phase */ |
| 8:  for each 1-D subcluster $c$ in $MS(e^t)$ { |
| 9:    if $c \notin Q^t$ |
| 10:     insert $c$ into $Q^t$ |
| 11:    else if $Q^t.c.count^t \geq S_{sig}$   // making filtered matching set |
| 12:     $\overline{MS(e^t)} = \overline{MS(e^t)} \cup c$ |
| 13:  } |
| 14:  for all prefix subset $u$ s.t. $\overline{u} \in (2^{\overline{MS(e^t)}} - \{\phi\})$, $u \in Q^t$, $|\overline{u}| = |u| + 1$ and $u \subset \overline{u}$ { |
| 15:    estimated the support of $\overline{u}$ $count(\overline{u})$ |
| 16:    if $count(\overline{u}) \geq S_{sig}$ |
| 17:     insert $\overline{u}$ into $Q^t$ |
| 18:  } |
| 19:  for all set of 1-D subcluster $u \in Q^t$ { |
| 20:    if $Q^t.u.count^t \geq S_{min}$ |
| 21:     $L^t = L^t \cup \{u\}$ |
| 22:  } |

(a) SUBSPACE TREE          (b) 2-D SPACE

METHOD AND SYSTEM OF CLUSTERING FOR MULTI-DIMENSIONAL DATA STREAMS

BACKGROUND OF THE INVENTION

1. Field of the Invention

The present invention relates to data mining for finding specific information by analyzing a large amount of data set, and in particular, to a clustering method and system for finding a subcluster from a multi-dimensional data stream.

2. Description of the Related Art

Recently, an application environment for processing a massive amount of data, such as a web surfing log or communication log, real time moving picture data, real time stock trade, etc. in real time has increased and correspondingly a demand of the data stream analysis has also increased, thus, research on data mining for analyzing data streams have progressed.

Clustering, which is one of the data mining analysis methods, is a data mining technique that partitions a plurality of data elements into a similar cluster according to given similarity measure. The clustering has been used as an efficient method in various application fields, such as satellite image analysis, targeting markets by customer analysis, large-capacity log analysis for intrusion detection, etc.

The clustering method in the related art considers only the case when similar data elements forms a cluster on a space in which all the attributes of the corresponding data elements are formed, but a subspace clustering searches clusters in a space in which attributes corresponding to a subset of all the attribute sets.

The data set often includes many dimensions in real life and any dimensional value of the data element may be lost. In such a multi-dimensional data set, a group of similar data elements, that is, the cluster is associated with all the dimensions of the data set as well as other subsets of dimensions. Several subspace clustering algorithms proposed to solve the above problems, but most of them needs a multi scan or a massive calculation process for data set. As a result, these algorithms are inappropriate for an online data stream.

As a method applicable for the data stream, there is a method using a sibling tree that is disclosed in Article "Nam Hun Park and Won Suk Lee Grid-Based Subspace Clustering Over Data Streams. in: Proc. of the Sixteenth ACM Conference on Information and Knowledge Management". This method is a grid based method, which finds n-dimensional clusters and then searches all the extendable (n+1) dimensional spaces. This method maintains a sibling list using a fine-grain grid on each node of a tree structure for searching the cluster. Therefore, as the number of dimensions of the data stream is increased, a large amount of processing time and a large sized memory are needed to maintain and search the exponentially increased grid-cells.

SUMMARY OF THE INVENTION

A technical problem to be achieved by the present embodiment is to provide a subspace clustering method and system that can be applied for data streams and require less processing time and memory.

In order to solve the technical problem, a method for clustering multi-dimensional data streams includes: (a) when data elements are input, determining 1-D subclusters and assigning identifiers to the determined 1-D subclusters; (b) generating a matching set that is a set of identifiers of the 1-D subclusters where each dimensional value of the data elements belongs to the range of the 1-D subclusters of the corresponding dimensions; and (c) determining subclusters by finding a set of frequently co-occurring 1-D subclusters among the set of 1-D subclusters belonging to the generated matching set.

The statistical distribution information of the previously generated data elements for each dimension forming a data space is managed by using grid-cells defined by a data interval and step (a) compares a occurrence count of the data element belonging to the grid-cell with a predetermined support for each dimension and can determine the 1-D subcluster according to the results.

Further, the identifiers of the 1-D subclusters belonging to the previously generated matching set are managed using a prefix tree and each node of the prefix tree has the occurrence count information of the data elements belonging to the data space corresponding to the node in question. The clustering method may further include updating the prefix tree according to the 1-D subcluster included in the generated matching set.

Further, the step (c) compares the support of the data space corresponding to each node of the prefix tree with the predetermined support to find a set of frequently co-occurring 1-D subclusters.

In addition, the matching set of the data elements $e^t = \langle e_1^t, e_2^t, \ldots, e_d^t \rangle$ in a d-dimensional data space may be defined by the following Equation.

$$MS(e^t) = \{s | s \in C_j^t \text{ and } e_j^t \in s, 1 \leq j \leq d\}$$

where $C_j^t$ denotes a set of 1-D subclusters in a jth dimension.

Moreover, when a sequence of the dimensions for current data streams $D^t$ of the d-dimensional data space $N = N_1 \times N_2 \times \ldots \times N_d$ is $N_1 \rightarrow N_2 \rightarrow \ldots \rightarrow N_d$, the prefix tree has a root node $n_{root}$ having a "null" value and each node in a kth ($1 \leq k \leq d$) depth except for the root node may be associated with an identifier c of the 1-D subcluster where the interval of the subcluster is $I_c$ in a domain of the corresponding dimension.

Also, when a k-depth node v associated with the 1-D subcluster $c_k$ is given, $\rho = root \rightarrow c_1 \rightarrow c_2 \rightarrow \ldots c_{k-1} \rightarrow c_k$ denotes a sequence of the 1-D subclusters associated with the nodes in a path from the root to the node v and the dimension of the 1-D subclusters $c_j$ is $N_j^t$ ($1 \leq j \leq k$), the node v may correspond to a k-dimensional rectangular space whose range is defined by range(v)=$I_{c_1} \times I_{c_2} \times \ldots \times I_{c_k}$ in the k-dimensional subspace $S^k = N'_1 \times N'_2 \times \ldots N'_k$ ($S^k \subseteq N$).

Also, each node of the prefix tree except for the root node may have the cluster identifier of the 1-D subcluster associated with the node v, the number of data elements in the range v, information of the rectangular space in the range v.

In addition, the updating the prefix tree may include updating the occurrence count information while traversing the nodes corresponding to the subsets of generated matching set in a depth-first manner.

Further, the updating the prefix tree may further include comparing the updated support of the node with the significant support so as to remove the node and the child node from the prefix tree according to the comparison result.

In addition, the updating the prefix tree may further include inserting a new node according to the generated matching set into the prefix tree while traversing the prefix tree.

Further, the inserting of the new node into the prefix tree may include inserting the node corresponding to the 1-D subcluster into a first depth of the prefix tree when the generated match set includes the 1-D subclusters that are not maintained in the prefix tree; and inserting a new node corresponding to the multi-dimensional rectangular space according to the generated matching set.

In addition, the inserting the new node corresponding to the multi-dimensional rectangular space may filter the insignificant 1-D subclusters in the generated matching set and insert a new node corresponding to (k+1)-dimensional rectangular space by a 1-D subcluster subsequent to a dimension of the 1-D subcluster whose dimension is associated with the node v among the 1-D subclusters of the filtered matching set when visiting the k-depth node v corresponding to the k-dimensional rectangular space R(v).

Also, in inserting the new node corresponding to the (k+1)-dimensional rectangular space, the new node can be inserted according to the result generated by estimating the support of the new node and comparing the estimated support with the predetermined significant support.

Moreover, the information of the rectangular space of the range v may include the averages and standard deviations of each of the dimensional values of the data elements belonging to the rectangular space.

Also, the clustering method may further include determining a predetermined interval based on the averages of each of the dimensional values to be the range of the subcluster as a step of refining the range of the subcluster from the determined subcluster.

Further, when the average and standard deviation of an ith dimension are $\mu_i$ and $\sigma_i$, the predetermined interval for the ith dimension may be determined between $\mu_i + \delta\sigma_i$ and $\mu_i - \delta\sigma_i$ by using a user-defined value $\delta$.

In order to solve the technical problem, a system for clustering multi-dimensional data streams according to the present embodiment includes: when data elements are input, a 1-D subcluster determining unit that determines 1-D subclusters and assigns identifiers to the determined 1-D subclusters; a matching set generating unit that generates a matching set which is a set of identifiers of the 1-D subclusters, each dimensional value of the data elements being included in the range of the 1-D subclusters of the corresponding dimensions; and a subcluster determining unit that determines subclusters by finding a set of frequently co-occurring 1-D subclusters among the sets of 1-D subclusters belonging to the generated matching set.

In order to solve the technical problem, a recording medium readable by a computer in which programs for executing the method for clustering multi-dimensional data streams according to the present embodiment are recorded is provided.

With the present embodiment, more than two dimensional subclusters are determined by first determining the 1-D subclusters existing in each dimension of the data streams and finding a set of frequently co-occurring 1-D subclusters among the 1-D subclusters, making it possible to significantly improve the processing time and the performance of the memory required to find the subclusters.

BRIEF DESCRIPTION OF THE DRAWINGS

FIGS. 2a and 2b show a process of dynamically generating the sibling list according to one embodiment of the present invention;

FIG. 5 illustrates how a new node is inserted into a subspace tree according to one embodiment of the present invention;

FIGS. 6 and 7 illustrate an algorithm of a multi-dimensional subspace clustering method according to one embodiment of the present invention;

DETAILED DESCRIPTION OF THE PREFERRED EMBODIMENTS

Figure 1:
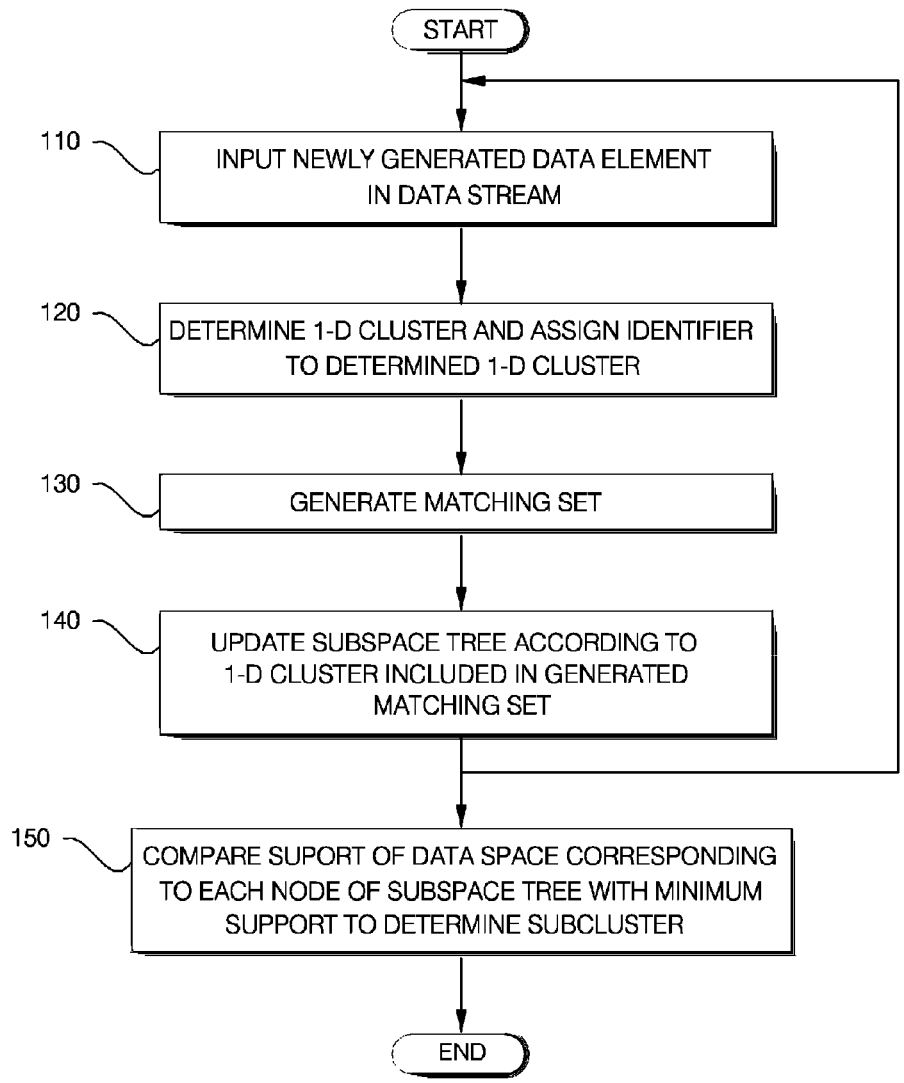
FIG. 1 is a block diagram of a clustering method for multi-dimensional data streams according to one embodiment of the present invention.

Hereinafter, preferred embodiments of the present invention will be described with reference to the accompanying drawings. In the following description and drawings, like components refer to like reference numerals and therefore, the duplicated description thereof will be omitted. In addition, the detailed description of known functions and configurations will be omitted so as not to obscure the subject of the present invention with unnecessary detail.

In order to effectively trace a current set of all the subclusters for multi-dimensional data streams, two significant operations are used in the embodiments described below. One operation is to continuously trace each single dimension of all the 1-D subclusters. To this end, a 1-D version of a method disclosed in "Nam Hun Park and Won Suk Lee. Cell Trees: An Adaptive Synopsis Structure for Clustering Multi-dimensional On-line Data Streams. J. Data & Knowledge Engineering" is used. The other finds a set of frequently co-occurring 1-D subclusters. This operation considers each of the 1-D subclusters as differentiated items, thereby causing a problem in finding frequent itemsets for on-line data streams.

When a d-dimensional data stream is provided, if there is a k-dimensional subcluster in a k-dimensional subspace (k≤d), there should also exist k 1-D subclusters each of which includes a distinct one-dimensional projection of the k-D subcluster. In other words, all the data elements of the k-dimensional subclusters should be included in each of the 1-D subclusters according to the corresponding dimensional values. The range of each of the 1-D subclusters should include the range projected from the k-dimensional cluster to the 1-D subcluster of the k-dimensional cluster. The existence of the k-dimensional subcluster can be deduced through this observation. When each of the sets of the k number of 1-D subclusters existing in the differentiated dimension is provided, if a k-dimensional rectangular space, in which the sets are crossed, does not empty, a possibility that the k-dimensional subcluster exists in this space is very high. In order to find out whether there really is a subcluster or not, the density of the data elements in the space should be monitored more accurately.

The range of each of the 1-D subclusters in the separate dimension becomes a granule that finds higher dimensional subclusters. For newly generated data elements, a transaction called a matching set described below is generated to convert the granule of the dimensional values of the data elements. For each dimension, if the dimensional value corresponding to the new data element is in the range of the 1-D subcluster of the dimension, the value is replaced by an identifier of the 1-D subcluster and otherwise, the value is disregarded. The sets of the k number of frequently co-occurring 1-D subclusters in the matching sets generated so far can form a candidate k-dimensional rectangular space for the k-dimensional subcluster.

A prefix tree (hereinafter, referred to as a subspace tree) for managing the identifiers of the 1-D clusters belonging to the matching set monitors all the candidate rectangular spaces. A structure of the subspace tree applies a structure of a lexicographic prefix tree used in an estDec method that finds the frequent itemsets for the on-line data stream [Joong Hyuk Chang, Won Suk Lee. Finding Recent Frequent Itemsets Adaptively Over Online Data Streams. in: Proc. of the Ninth ACM SIGKDD International Conference on Knowledge Discovery and Data Mining, 2003, pp. 487-492]. When the minimum support defined by a user is given, the current support of the k-dimensional rectangular space formed by a set of k number of co-occurring 1-D subclusters is a ratio of the total number of matching sets generated until now to the number of matching sets including the 1-D subclusters. If the support becomes larger than or equal to $S_{min}$, the k-dimensional rectangular space is a frequent space and includes the k-dimensional subclusters. When a dense grid-cell having a fixed size is provided, according to the present embodiment, it is possible to trace the 1-D subclusters of each dimension at a degree that accurately corresponds to the sibling tree method. The identified 1-D subclusters define coarser grid-cells having a variable size in order to identify the multi-dimensional subclusters. Therefore, the present embodiment demands a less memory space and takes less processing time at the expense of the accuracy of the range of the identified multi-dimensional subcluster.

FIG. 1 is a flow chart of a method for clustering multi-dimensional data streams according to one embodiment of the present invention.

Referring to FIG. 1, if the data elements newly generated in the multi-dimensional data streams are input (step 110), the 1-D cluster is determined and the identifier is provided to the determined 1-D cluster (step 120). A process of determining the 1-D cluster and a process of providing the identifier to the determined 1-D cluster will be described below.

Each dimensional value of the data elements generates the matching set that is a set of 1-D clusters where each dimensional value of the data elements belongs to the range of the 1-D cluster of the corresponding dimension (step 130). The identifiers of the 1-D clusters belonging to the previously generated matching set are managed using the subspace tree. Each node of the subspace tree has the occurrence count information of the data space corresponding to the node in question. At step 140, the subspace tree is updated according to the 1-D cluster included in the generated matching set. The structure of the subspace tree and the process of updating the subspace tree will also be described in detail.

As shown, steps 110 to 140 are repeated each time the data elements are input.

Step 150, which is a process of finding a set of frequently co-occurring 1-D clusters among a set of 1-D clusters belonging to the generated matching set, compares the support of the data space corresponding to each node of the subspace tree with the minimum support to determine the subclusters. The step can be performed each time the data elements are input and on the other hand, can be performed according to the user request when the user finds the subclusters. The step will also be described in detail below.

In describing the present embodiment, a symbol to be used is defined as follows.

i) a jth generated data element in a data stream D given in a d-dimensional data space $N=N_1 \times \ldots \times N_d$ is represented by $e^j=<e_1^j, e_2^j, \ldots, e_d^j>$, $e_i^j \in N_i$, $1 \leq i \leq d$.

ii) when $e^t$ is generated in $t^{th}$ order, a recent data stream $D^t$ is defined by a set of data elements $D^t=\{e^1, e^2, \ldots, e^t\}$ generated up to $t^{th}$ and the number of data elements in the recent data stream $D^t$ is represented by $|D^t|$.

At step 120, a process of determining the 1-D cluster will be described as follows. In order to determine the 1-D cluster, the statistical distribution information of the previously generated data elements is managed using the grid-cells having the statistical distribution information of the data elements that are partitioned according to the range of the data space and exists in the corresponding range. Further, the statistical distribution information of the data elements is managed using these grid-cells, sibling entries including the grid-cells, a sibling list that is a structure where the sibling entries are connected to each other, and a grid-cell tree structure that is a structure where the sibling list is formed for each level.

Hereinafter, the generation and management of the sibling list will first be described in the 1-D data space.

The present embodiment finds the 1-D cluster by using the data stream as an element in the 1-D data space using the sibling list. Specifically, the grid-cells dynamically partitioned according to the distribution of the data element using the sibling list manages only the statistical information of the data element distribution in each corresponding range, making it possible to effectively find the clusters without storing and searching the data elements as compared to the clustering technique in the related art. First, the h number of equal-size initial grid-cells $G=\{g_1, g_2, \ldots, g_h\}$ (where, $$\bigcup_{i=1}^{h} g_i \cdot I \equiv \text{range}(N),$$

$g_i \cdot I \cap g_j \cdot I = \Phi$, $i \neq j$, and, $1 \leq i$, $j \leq h$) is generated in the range range(N) of the given 1-D data space N according to the predefined partitioning factor. The grid-cell $g_i$ manages the statistical distribution information of the data elements generated in its range $g_i \cdot I$. This is defined as follows.

<Definition 1 Grid-cell g(I, c, μ, σ)>

$g(I, c^t, \mu^t, \sigma^t)$ for the data stream $D^t$ denotes the statistical distribution information for the data elements existing in the space $g \cdot I$ of the grid-cell g. When $D_g^t$ is a set of data elements, that is, $D_g^t = \{e | e \in D^t \text{ and } e \in R(g)\}$, that exists in the range RS of the grid-cell g among the data stream $D^t$, the statistical distribution information of the grid-cell g can be defined as follows.

i) Number of data elements existing in $g \cdot c^t$: $D_g^t$ ii) Average of data elements in $g \cdot \mu^t$: $D_g^t$ $$g \cdot \mu^t = \sum_{j=1}^{c^t} e^j / c^t$$

iii) Standard deviation of data elements in $g \cdot \sigma^t$: $D_g^t$ $$g \cdot \sigma^t = \sqrt{\sum_{j=i}^{c^t} (e^j - g \cdot \mu^t)^2 / c^t}$$

When the support of the grid-cells, that is, the ratio $g \cdot c^t / |D^t|$ of the number of total data elements generated in the data streams to the number of data elements generated in the corresponding grid-cells is a partitioning support $S_{par}$ or more that is a predetermined value, the corresponding grid-cells are partitioned again into the h number of small grid-cells having the same size. The partitioning process is repetitively performed on the grid-cells in the range in which the occurrence count of the data elements is high. A sequence according to the range of each grid-cell exists between the grid-cells. For the grid-cells $G=\{g_1, g_2, \ldots, g_v\}$ in the data space, the sequence of the grid-cells is defined by $\prec (g_i, g_j), g_i(I, c, \mu, \sigma) \prec g_j(I, c, \mu, \sigma)$ in the case of $g_i \cdot I < g_j \cdot I$. In order to effectively manage the dynamically generated grid-cells, the sibling list can be defined as follows.

<Definition 2 Sibling List S>

The sibling list S having order m for the data stream $D^t$ generated in the 1-D space N will be described as follows.

1) The sibling list $S=<E_1, E_2, E_3, \ldots, E_p>$ has a structure of a single linked list that is composed of sibling entries $E_1, E_2, \ldots, E_p$.

2) The sibling entry $E_i$(min, max, G[1, ..., m], next_ptr) manages the following items.

i) Space that stores the maximum m grid-cells of G[1, ..., m].

ii) When the v(<m) grid-cells are stored in the sibling entry, the range range (E) of the sibling entry is defined by $$\text{range}(E) = \bigcup_{i=1}^{v} G[i] \cdot I$$

([min, max), min=G[1]·I·s, max=G[v]·I·f). Further, the grid-cells in the sibling entry is aligned to satisfy $G[i] \cdot I \prec G[j] \cdot I$ $1 \leq i < j \leq v$.

iii) next_ptr: pointer pointing out the following sibling entry.

3) The range of the sibling list S is defined by the link of the range of all the sibling entries and conforms to the range of the given 1-D data space N. That is, $$\text{range}(S) = \bigcup_{i=1}^{p} \text{range}(E_i) = \text{range}(N).$$

4) All the sibling entries other than the first sibling entry have the grid-cell of the minimum $\lceil (m-h+2)/2 \rceil$ at all times.

For the newly generated data element $e^t$, the grid-cell in the corresponding range including $e^t$ value in the sibling list is searched and the statistical distribution information of the data elements of the grid-cell g is then updated. Recently, for $v(v<t)^{th}$ data element, if the statistical distribution information of the grid-cell g is updated, the statistical distribution information can be updated according to the following Equation by $e^t$.

$$g \cdot c^t = g \cdot c^v + 1 \qquad [\text{Equation 1}]$$

$$g \cdot \mu^t = \frac{g \cdot \mu^v \times g \cdot c^v + e^t}{g \cdot c^t}$$

$$g \cdot \sigma^t = \sqrt{\frac{\frac{g \cdot c^v}{g \cdot c^t} \times (g \cdot \sigma^v)^2 + \frac{(g \cdot \mu^v)^2 + (e^t)^2}{g \cdot c^t} - (g \cdot \mu^t)^2}}$$

If the occurrence count of the data elements belonging to the grid-cell, that is, the support $g \cdot c^t / |p^t|$ is less than the partitioning support $S_{par}$, which is a partitioning support, and then, is $S_{par}$ or more, the grid-cell g is partitioned into the h small grid-cells $g_1, \ldots, g_h$ having the same size and the statistical distribution information in the corresponding range of each of the partitioning grid-cells is estimated. At this time, the distribution degree of the jth grid-cell $g_j (1 \leq j \leq h)$ among the grid-cells partitioned into $g_1, \ldots, g_h$ can be estimated according to the following Equation from the normal distribution function $$\varphi(x) = \frac{1}{\sqrt{2\pi} g_j \cdot \sigma^t} e^{-\frac{(x - g_j \cdot \mu^t)^2}{2(g_j \cdot \sigma^t)^2}}$$

of g.

$$g_j \cdot c^t = g \cdot c^t \times \int_{g_j \cdot s}^{g_j \cdot f} \varphi(x) dx \qquad [\text{Equation 2}]$$

$$g_j \cdot \mu^t = \int_{g_j \cdot s}^{g_j \cdot f} x \varphi(x) dx$$

$$g_j \cdot \sigma^t = \sqrt{\int_{g_j \cdot s}^{g_j \cdot f} (x \varphi(x))^2 dx - (g_j \cdot \mu^t)^2}.$$

Figure 2B:
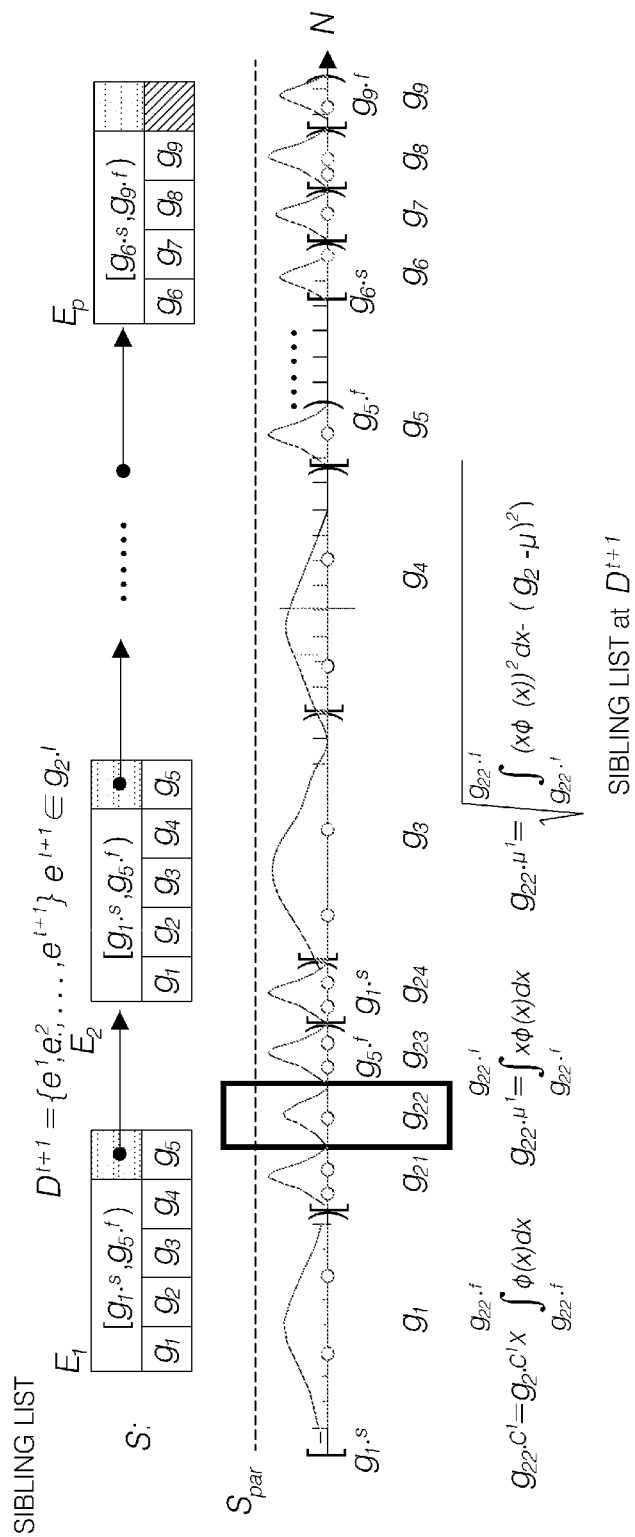

FIGS. 2a and 2b illustrate a process of dynamically generating the sibling list having the order m=5 and h=4 according to one embodiment of the present invention. FIG. 2a illustrates the sibling list in the data stream $D^t$ and FIG. 2b illustrates the sibling list in the data stream $D^{t+1}$.

Referring to FIG. 2b, the grid-cell $g_2$ is partitioned into four grid-cells $g_{21}, g_{22}, g_{23}$, and $g_{24}$. At this time, the statistical distribution information of $g_{22}$ can be obtained according to the following Equation.

$$g_{22} \cdot c^t = g_2 \cdot c^t \times \int_{g_{22} \cdot s}^{g_{22} \cdot f} \varphi(x) dx \qquad [\text{Equation 3}]$$

$$g_{22} \cdot \mu^t = \int_{g_{22} \cdot s}^{g_{22} \cdot f} x \varphi(x) dx$$

$$g_{22} \cdot \sigma^t = \sqrt{\int_{g_{22} \cdot s}^{g_{22} \cdot f} (x \varphi(x))^2 dx - (g_{22} \cdot \mu^t)^2}.$$

This partitioning process is repetitively performed until the size of the partitioned grid-cell becomes the unit grid-cell having the predetermined minimum size λ.

When the range $N_j$ of the jth $(1 \leq j \leq d)$-dimensional data space is given, the total frequency of partitioning operations required to generate the 1-D unit grid-cell is $\log_h(\text{range}(N_j)/\lambda)$. The 1-D subclusters in $N_j$ are a group of adjacent dense unit grid-cells where each of the current support becomes larger than or equal to $S_{min}$. The distribution statistic of the data elements in the data stream can be changed with the passage of time, such that the specific grid-cells can be coarse even though they are dense in the past. For the grid-cell, when its current support of the grid-cell becomes less than or equal to a predetermined merge threshold $S_{mer}(<S_{par}<S_{min})$ its possibility of becoming a dense grid-cell in the near future is considered to be low enough to disregard. Therefore, such a grid-cell g in a sibling entry E is merged with a set of other sparse grid-cells whose intervals are consecutive. However, not all of the consecutive grid-cells in the sibling entry E are legitimate candidates for merging. In order to keep the interval size of every unit grid-cell to be λ, among the grid-cells with the same sibling entry E, only those grid-cells that were partitioned together with the coarse grid-cell g can be the candidates. For a particular grid-cell g, such candidate grid-cells are found in their merging range. All the grid-cells that were originally partitioned together with the grid-cell g are in the merging range of the grid-cell g.

Figure 3:
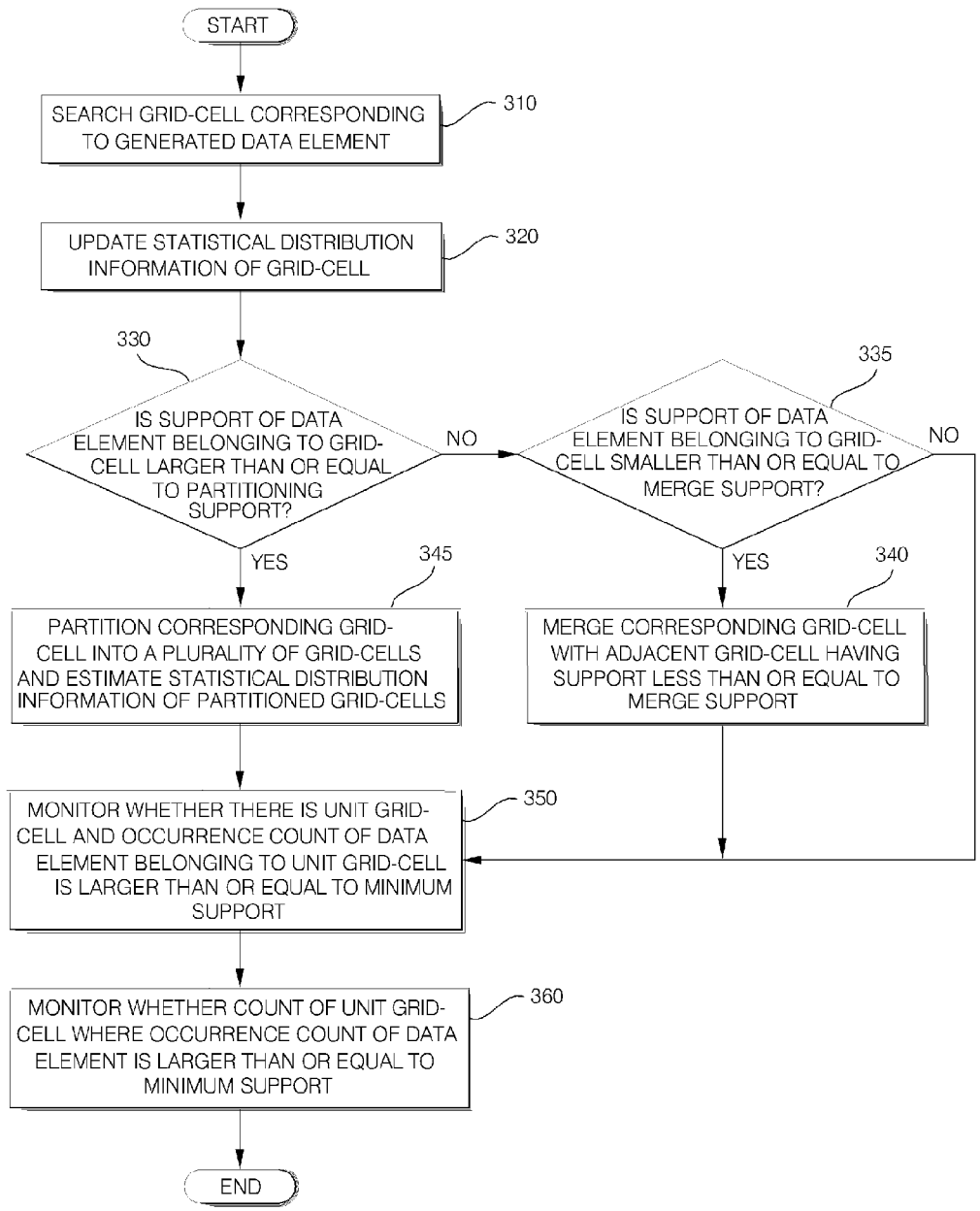
FIG. 3 is a flowchart of a method for finding 1-D clusters according to one embodiment of the present invention.

FIG. 3 is a flowchart of a method for finding a 1-D cluster according to the one embodiment. The method according to the present invention is a method for finding a 1-D cluster based on the grid-cell and the sibling list as described above.

At step 310, the grid-cells corresponding to the generated data elements are searched.

At step 320, the statistical distribution information of the searched grid-cell is updated. At this time, the statistical distribution of the grid-cell can be updated according to the foregoing Equation 1.

At step 330, whether the support of the data element belonging to the corresponding grid-cell becomes larger than or equal to the partitioning support $S_{par}$ is examined. If so, it proceeds to step 345 and if not, it proceeds to step 335.

At step 345, the corresponding grid-cell is partitioned into the plurality of grid-cells and the statistical distribution information of the partitioned grid-cell is estimated. At this time, the statistical distribution can be estimated according to the above Equation 2. However, at step 345, if the corresponding grid-cell already becomes the unit grid-cell having a size λ, the grid-cell is not partitioned.

At step 335, whether the support of the data element belonging to the corresponding grid-cell becomes smaller than or equal to the partitioning support $S_{mer}$ that is a predetermined value is examined. If so, it proceeds to step 340 and if not, it proceeds to step 350.

At step 340, the corresponding grid-cell is also merged with the adjacent grid-cell having the support that becomes less than or equal to the merge support $S_{mer}$. If the support of the grid-cell becomes less than and equal to the merge support $S_{mer}$ ($c^t/|D^t| \leq S_{mer}$), a possibility of existing the cluster in the range of the corresponding grid-cell can be considered to be very low. Therefore, the number of unnecessary grid-cells independent of the cluster can be reduced by merging these grid-cells as in steps 335 and 340 and the used amount of the memory can be reduced accordingly.

At step 350, whether there is the unit grid-cell having the size λ and the occurrence count of the data element belonging to the unit grid-cell, that is, the support $g \cdot c^t/|D^t|$ becomes larger than or equal to the minimum support $S_{min}$ that is a predetermined value is monitored.

At step 360, a set of adjacent unit grid-cells obtained from the monitored at step 360 result then determines the cluster.

If the 1-D subcluster is determined, the identifier is assigned to the determined 1-D subcluster. In detail, it can be provided as follows.

When the 1-D subcluster c formed by a set of w consecutive grid-cells [$g_1, g_2, \ldots, g_w$] is provided, their density is defined by the average number of data elements per the grid-cell as described in the following Equation.

$$\rho(c) = \sum_{i=1}^{w} g_i \cdot c^t / w \text{ where } g_i \in c \ (1 \leq i \leq w) \quad \text{[Equation 4]}$$

The 1-D subclusters of the data stream are consecutively evolved. In other words, two adjacent 1-D subclusters are merged into a single 1-D cluster or the 1-D subcluster can be partitioned into a plurality of smaller 1-D subclusters. In order to effectively reflect the evolution of the 1-D subclusters for the data streams, the identifier of the 1-D subclusters are assigned by the following rule.

i) when the 1-D subcluster c is partitioned into the plurality of less 1-D sub-clusters, the subcluster having the largest average density has the identifier of the 1-D subcluster c and the new identifiers are uniquely assigned to other 1-D subclusters.

ii) When two 1-D subclusters are merged into one, the identifier of the 1-D subcluster with the higher average density is assigned to the identifier of the merged one.

Based on the above rules, the identifiers of all one-dimensional subclusters can be uniquely maintained and a denser interval is assigned to the same 1-D subcluster identifier longer.

The matching set generated in step 130 will now be described in detail.

Given the current data stream $D^t$ of a d-dimensional space $N=N_1 \times N_2 \times \ldots \times N_d$, let Dom(Nj) denote the domain of the jth dimension $Nj \subset N(1 \leq j \leq d)$. The range of the ith 1-D subcluster in Nj can be represented by an interval $I_{ji}=[s_i, f_i]$, $s_i, f_i \in$ Dom ($N_j$). The 1-D subclusters of the dimension Nj are continuously traced by a sibling list Sj as described above. Whenever a new data element $e^t$ is generated, its jth dimensional value is used to reflect the occurrence of et in the sibling list Sj. Furthermore, the granule of every dimensional value of et is converted by producing a matching set defined in Definition 3.

<Definition 3 Matching Sets>

Given a sequence of dimensions $\rho=N_1 \rightarrow N_2 \rightarrow \ldots \rightarrow N_d$, let $S_1, S_2, \ldots, S_d$ denotes the sibling lists for the current data stream $D^t$ of a d-dimensional data space $N=N1 \times N2 \times \ldots \times Nd$ and let $C_j^t$ denote the set of 1-D subclusters found in the sibling list $Sj (1 \leq j \leq d)$ for the jth dimension $Nj \subset N$. The matching set $MS(e^t)$ of the newly generated data element $e^t=<e_1^t, e_2^t, \ldots, e_d^t>$ is defined as follows:

$$MS(e^t)=\{s|s \in C_j^t \text{ and } e_j^t \in s, 1 \leq j \leq d\} \quad \text{[Equation 5]}$$

For example, given a dimension sequence $N_1 \rightarrow N_2 \rightarrow \ldots \rightarrow N_d$, suppose only each of the first two and the last two dimensional values of a new data element $e^t=<e_1^t, e_2^t, \ldots, e_d^t>$ is in the range of a 1-D subcluster in its corresponding dimension, say c1, c2, cd-1 and cd respectively. The resulting matching set for the data element $e^t$ becomes $MS(e^t)=<c^1, c^2, c^{d-1}, c^d>$.

To find out the sets of frequently co-occurring 1-D subclusters, the current d-dimensional data stream $D^t$ can be viewed as an infinite set of the continuously generated matching sets as follows.

i) Let $L^t=C_1^t \cup C_2^t \cup \ldots \cup C_d^t$ be a set of all the currently identified 1-D subclusters in the d dimensions.

ii) A matching set for a data element generated at the tth turn is denoted by $MS(e^t)$. A matching set $MS(e^t)$ is a subset $(MS(e^t) \subset L^t)$ of $L^t$ and is considered as an atomic unit of information.

iii) The current data stream $D^t$ is composed of all the matching sets that have ever been generated so far, i.e., $D^t=<MS(e^1), MS(e^2), \ldots, MS(e^t)>$ and the total number of matching sets in $D^t$ is denoted by $|D^t|$.

iv) A set of co-occurring 1-D subclusters a is a subset of at least one matching set b generated in the current data stream $D^t$, i.e, $\exists b \in Dt$ such that $a \subset b$.

Hereinafter, a process of tracing multi-subclusters using the matching set, that is, steps 140 to 150 of FIG. 1 will be described. The subclusters manages the identifiers of the 1-D clusters belonging to the previously generated matching set and each node is traced by using the prefix tree having the occurrence count information of the data element belonging to the data space corresponding to the node in question.

The multi-dimensional subclusters in the data streams can be traced by monitoring all the sets of frequently co-occurring 1-D subclusters in the generated matching set. This procedure applies the estDec method that finds all frequent itemsets in the transactions of an online data stream. A transaction is a set of co-occurring itemsets and the itemset is a set of items. Given a minimum support threshold Smin, the support of the itemset is the ratio of the number of transactions that contain the itemset over the total number of transactions generated so far.

In the estDec method, if its current support becomes greater than or equal to a user-defined significant support threshold $S_{sig}(<S_{min})$, the itemset is a significant itemset. The method examines each transaction generated in a data stream one by one without any candidate generation. It keeps track of the occurrence count of every significant itemset in the transactions generated so far by a monitoring tree whose structure is a prefix tree. Each significant itemset is represented by a node of the prefix tree. The two major operations: delayed-insertion and pruning operations guarantee that all of the currently significant itemsets are maintained in the tree. By estimating the current count of an itemset, monitoring the actual count of an itemset can be delayed until the itemset becomes a significant itemset. On the other hand, although an itemset was significant enough to be monitored in the past, if its current support becomes less than $S_{sig}$, its actual count is no longer monitored.

In the embodiment, the subspace tree additionally maintains a rectangular space synopsis defined in the following description in order to keep track of the distribution statistics of those data elements that fall in the rectangular space of a multidimensional subspace.

<Definition 4 Rectangular Space Synopses)>

Given a k-dimensional rectangular space v in a k-dimensional subspace $S^k=N'_1 \times N'_2 \times \ldots N'_k (S^k \subset N)$ for a data stream of a d-dimensional data space $N=N_1 \times N_2 \times \ldots \times N_d$, let R(v) denote a set of data elements whose dimensional values in the subspace Sk fall in the rectangular space v. The data distribution of the k-dimensional rectangular space is represented by a rectangular space synopsis $RSS_k(v)=(\mu, \sigma, ssum)$ as follows:

$\mu=(\mu_1, \mu_2, \ldots, \mu_k)$, $\sigma=(\sigma_1, \sigma_2, \ldots, \sigma_k)$, $ssum=(ssum_1, ssum_2, \ldots, ssum_k)$, where the terms $\mu i$ and $\sigma i$ denote the average and standard deviation of the ith dimensional values of data elements in R(v). In addition, the term ssumi denotes the squared sum of the ith dimensional values.

The structure of an ST-tree is defined as follows.

<Definition 5 A Subspace Tree (ST-Tree)>

Given a sequence of dimensions $N_1 \to N_2 \to \ldots \to N_d$ for the current data stream $D^t$ of a d-dimensional data space $N=N_1 \times N_2 \times \ldots \times N_d$, an ST-tree $Q^t$ is defined as follows:

i) An ST-tree $Q^t$ has a root node nroot with a "null" value. Except for the root node, each node in the kth depth ($1 \le k \le d$) is associated with a 1-D subcluster $c \in L^t$ whose interval is denoted by $I_c=[S_c, f_c]$ the domain of its corresponding dimension.

ii) Given a k-depth node v with its associated 1-D subcluster ck, let $\rho=root \to c_1 \to c_2 \to \ldots c_{k-1} \to c_k$ be the sequence of 1-D subclusters associated with the nodes in the path from the root to the node v. Since the dimensions of the 1-D subclusters are distinct, let the dimension of 1-D subcluster cj be Nj' ($1 \le j \le k$). The node v is corresponding to a k-dimensional rectangular space whose range is defined by $range(v)=I_{c_1} \times I_{c_2} \times \ldots \times I_{c_k}$ in the k-dimensional subspace $S^k=N'_1 \times N'_2 \times \ldots N'_k (S^k \subset N)$.

iii) Except for the root node, every node v maintains a tuple (c, count$^t$, child[ ], RSS$^t$(v)) where:

c∈L$^t$: cluster identifier of a 1-D subcluster associated with the node v count$^t$: number of data elements in range(v)

RSS$^t$(v): rectangular space synopsis of range(v)

child[ ]: a list of child pointers

Figure 4:
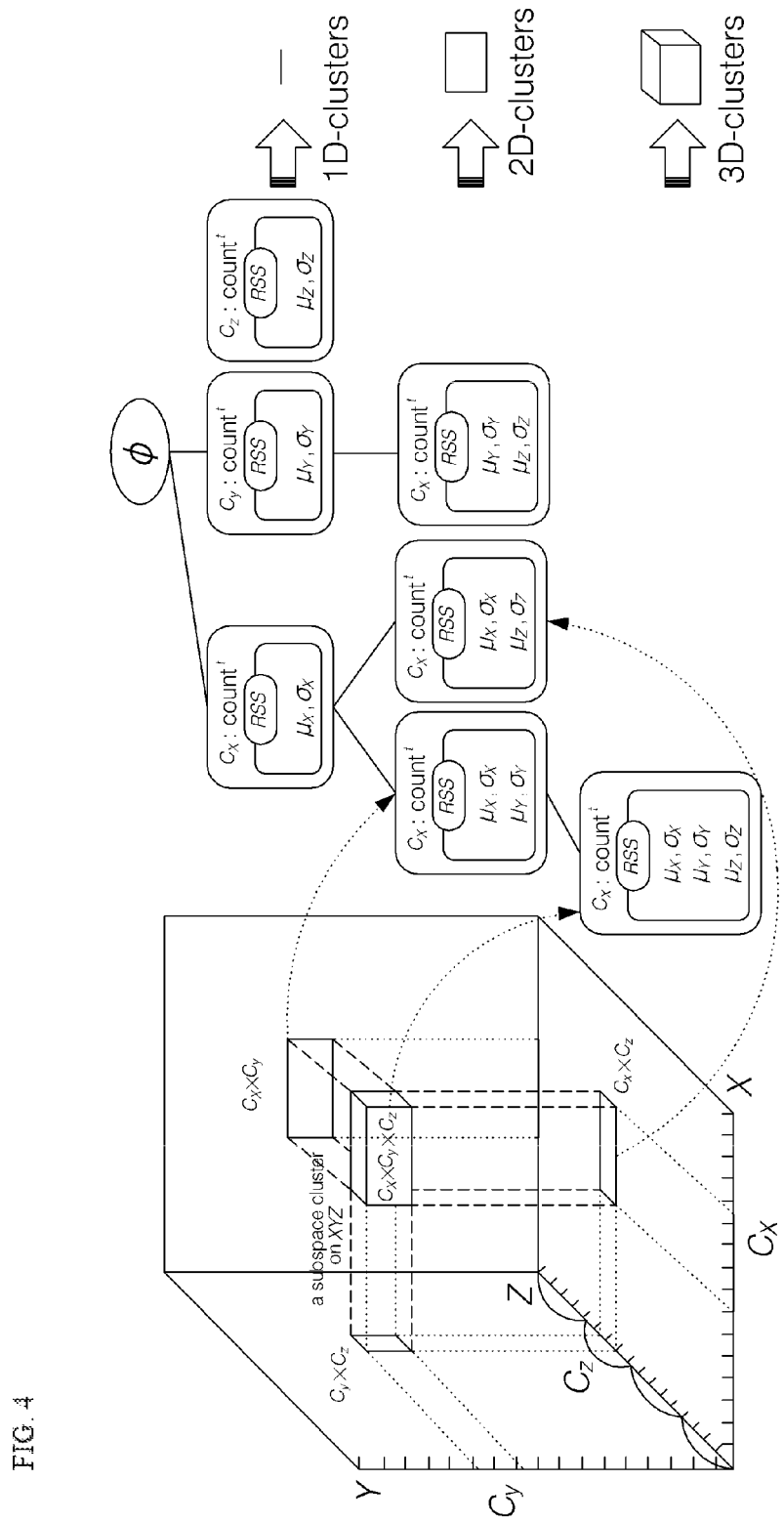
FIG. 4 illustrates an example of the subspace tree for modeling the 3-D data streams.

FIG. 4 illustrates an example of the subspace tree for modeling the 3-D data streams. As shown in FIG. 4, each node of an ST-tree is corresponding to a rectangular space. The depth of the subspace tree determines the dimension of the rectangular space. Its count keeps track of the number of data elements that were inside the rectangular space, i.e., the density of the rectangular space. Its rectangular space synopsis monitors how the data elements are distributed in the rectangular space.

Given a predefined sequence of dimensions $\rho=N_1 \to N_2 \to \ldots \to N_d$ for an ST-tree $Q^{t-1}$, whenever a new data element $e^t$ arrives, its matching set MS($e^t$) is generated as described above. In order to update the occurrence counts of all the subsets of MS($e^t$), their corresponding nodes in the STtree are traversed in a depth-first manner. Upon visiting a node, if the next 1-D subcluster identifier of the matching set is not matched with the 1-D subcluster identifier associated with the node, return to its parent node. Otherwise, the count of the node is incremented by one. When the node was lastly updated by the pth matching set MS($e^p$)(p<t), its corresponding rectangular space synopsis is updated as follows:

$$ssum_k^t = ssum_k^p + (e_k^t)^2, \quad \mu_k^t = \frac{\mu_k^p \times count^p + e_k^t}{count^t}, \quad [\text{Equation 6}]$$

$$\sigma_k^t = \sqrt{\frac{ssum_k^t}{count^t} - (\mu_k^t)^2}$$

When the updated support of the node becomes less than $S_{sig}$, the node and all of its descendant nodes are pruned from the tree.

After the supports of all the nodes induced by the current matching set MS($e^t$) are updated, the ST-tree is traversed once again to find out whether a new node can be inserted by MS($e^t$). When the current matching set MS($e^t$) contains a new 1-D subcluster that is not currently maintained in the ST-tree, the 1-D subcluster is instantly inserted in the first depth of the tree.

To insert a new node corresponding to a multi-dimensional rectangular space, the support of the space is estimated as follows: First, any insignificant 1-D subcluster in the current matching set is filtered out. This is because an insignificant 1-D subcluster can not be a part of a set of significantly co-occurring 1-D subclusters. At this time, the filtered matching set is used to traverse the ST-tree this time. Upon visiting a k-depth node v corresponding to a k-dimensional rectangular space R(v), the possibility of generating a new child node is examined. For this purpose, among the 1-D subclusters of the filtered matching set, let P be a set of 1-D subclusters whose dimensions are after the dimension of the 1-D subcluster associated with the node v. The k-dimensional rectangular space R(v) can be extended by each of the 1-D subclusters in P to form a candidate (k+1)-dimensional rectangular space. When the estimated support of a candidate is greater than or equal to $S_{sig}$, a new node corresponding to the candidate is inserted. The count of the newly inserted (k+1)-dimensional rectangular space is estimated by the counts of its k-dimensional projected rectangular spaces maintained in the ST-tree. Among the counts of these k rectangular spaces, the smallest value is assigned to the estimated count since it is the maximum possible number of data elements that could have been inside the range of the new (k+1)-dimensional rectangular space. Because of this, the initialized count may contain a false positive error count. The effect of this error count is diminished as the total number of data elements |Dt| is increased.

FIG. 5 illustrates how a new node is inserted to an ST-tree $Q^{99}$ for $S_{sig}=0.15$. A notation cji denotes the ith 1-D subcluster of the jth dimension Nj. Suppose that the matching set of the next data element $e^{100}$ is $MS(e^{100})=\{c_{12}, c_{21}, c_{31}, c_{41}\}$. All the nodes visited by $MS)(e^{100})$ are indicated by the shaded nodes in FIG. 3(b). When visiting these nodes in a depth-first manner, their counts are incremented by one respectively. Subsequently, the ST-tree is traversed once again to expand the tree. Among the 1-D subclusters of $MS(e^{100})$, only significant items are considered. The filtered matching set $MS(e^{100})=\{c_{12}, c_{21}, c_{31}, c_{41}\}$ is obtained during the previous update phase since the support of the 1-D subcluster $c_{31}$ in $MS(e^{100})$ is insignificant. Upon visiting the node $c_{21}$ in the path null→$c_{12}$→$c_{21}$, the supports of the rectangular spaces $c_{12} \times c_{21} \times c_{31}$ and $c_{12} \times c_{21} \times c_{41}$ are estimated to extend the ST-tree. As shown in FIG. 3(b), the node $c_{41}$ is newly generated as a child of $c_{21}$ since not only the supports of all the nodes corresponding to the two-dimensional projections of $c_{12} \times c_{21} \times c_{41}$ but also its estimated support $$\left(\frac{19}{100} = 0.19\right)$$

are greater than $S_{sig}$.

In the foregoing step 150, that is, the process of determining the subclusters by comparing the support of the data space corresponding to each node of the subspace tree with the minimum support, all the current subclusters of an ST-tree can be obtained by traversing the tree in a depth-first manner. When visiting a k-depth node v, if its current support (v.countt/|Dt|) is greater than or equal to $S_{min}$, the rectangular space of the node contains a k-D subcluster, such that the rectangular space can be determined to be the subcluster.

On the other hand, all insignificant k-dimensional rectangular spaces in an ST-tree can be pruned together by examining the current support of every node in the ST-tree. This mechanism is called a force-pruning operation. At this time, since all paths in an ST-tree should be traversed, the processing time of a force-pruning operation is relatively long. Therefore, it can be performed periodically or when the current size of an ST-tree reaches a predefined threshold value.

FIGS. 6 and 7 illustrate an algorithm of the multi-dimensional subspace clustering method according to the foregoing embodiments. FIG. 6 illustrates a process of generating the matching set by finding the 1-D clusters and FIG. 7 illustrate a process of finding the subclusters from the matching set.

Given two multi-dimensional subclusters, if their projected ranges on the same dimension are overlapped, only one 1-D subcluster whose range is the union of the projected ranges is identified. Therefore, it is impossible to differentiate the ranges of the two subclusters with respect to the projected dimension. This phenomenon is called an occultation which can degrade the precision of identified subclusters. For a d-dimensional data space $N_1 \times N_2 \times \ldots \times N_d$, let $O_i$ be an occultation event that takes place for the ith dimension ($1 \leq i \leq d$) of two subclusters. The probability of occurring an occultation on every dimension for the two subclusters is denoted by $P(O1 \cap \ldots \cap Od)$. According to the study in "Triola, M. F., Goodman, W. M., Law, R. Elementary Statistics First Canadian Edition, Addison-Wesley, Don Mills, Ontario, 1999", the probability value is obtained as follows:

$$P(O_1 \cap \ldots \cap O_d) = \left(\frac{2(r_1 + r_2)}{\pi \|x_1 - x_2\|}\right)^d \qquad \text{[Equation 7]}$$

where $r_1$ and $r_2$ are the radiuses of the two subclusters and the term $\|x1-x2\|$ represents the distance between the centers of the two subclusters. Therefore, the probability of occurring an occultation for two subclusters is proportional to the distance $\|x1-x2\|-(r1+r2)$ as well as the dimensionality of a rectangular space. Given two significant k-dimensional rectangular spaces, among their projected intervals on the k dimensions, if at least one interval is not overlapped, these two spaces are corresponding to two distinct k-depth nodes in an ST-tree. Consequently, the counts and rectangular space synopses of these spaces are traced independently.

As in a partitioning clustering algorithm, a subcluster for a group of similar data elements can be represented by the centroid of the data elements. For an identified subcluster, its centroid is the average $\mu^t$ of its rectangular subspace synopsis. For a k-depth node v, let the path from the root to the node v be $c_1 \to c_2 \to \ldots \to c_k$, where $c_i$'s ($1 \leq i \leq k$) are the associated 1-D subclusters. If the current support of the node is greater than or equal to Smin, i.e., v.count$^t$/|Dt|$\geq S_{min}$, its rectangular space contains a k-D subcluster m. The largest possible range of this k-D subcluster m is the k-dimensional rectangular space range(m)=$I_{c_1} \times I_{c_2} \times \ldots \times I_{c_k}$, where $I_{c_i}$ is the interval of its corresponding 1-D subcluster $c_i$ in the ith dimension $N_i$ ($1 \leq i \leq k$). For a multi-dimensional subcluster, it is possible to refine its range with respect to the statistical properties, i.e., the average and standard deviation of its rectangular space synopsis. According to the well-known Chebyshev's Inequality Theorem, "[Triola, M. F., Goodman, W. M., Law, R. Elementary Statistics First Canadian Edition, Addison-Wesley, Don Mills, Ontario, 1999]", if µx and σx are the average and standard deviation of a random factor X for any positive constant δ, the following inequality should be satisfied.

$$q = P(|X - \mu_x| < \delta \sigma_x) \geq 1 - \frac{1}{\delta^2} \qquad \text{[Equation 8]}$$

For a user defined confidence probability q, it is possible to determine the value of δ as well as the upper/lower bounds of the interval that contains at least q % of the data elements in each dimension. The upper bound is $\mu_x + \delta \sigma_x$ while the lower bound is $\mu_x - \delta \sigma_x$. As the value of δ gets larger, more data elements in the rectangular space of the subcluster can be included in the boundary.

Therefore, after the subcluster is determined by step 150, the present embodiment may further include a step of refining the range of the subcluster. At this step, the predetermined interval is determined to be the range of the subcluster based on the average value of each dimensional value of the rectangular space synopsis. For example, when the average and standard deviation of the ith dimension are $\mu_i$ and $\sigma_i$, the predetermined interval for the ith dimension of the subcluster can be determined between $\mu_i + \delta \sigma_i$ to $\mu_i - \delta \sigma_i$ by using the user-defined value δ.

Figure 8:
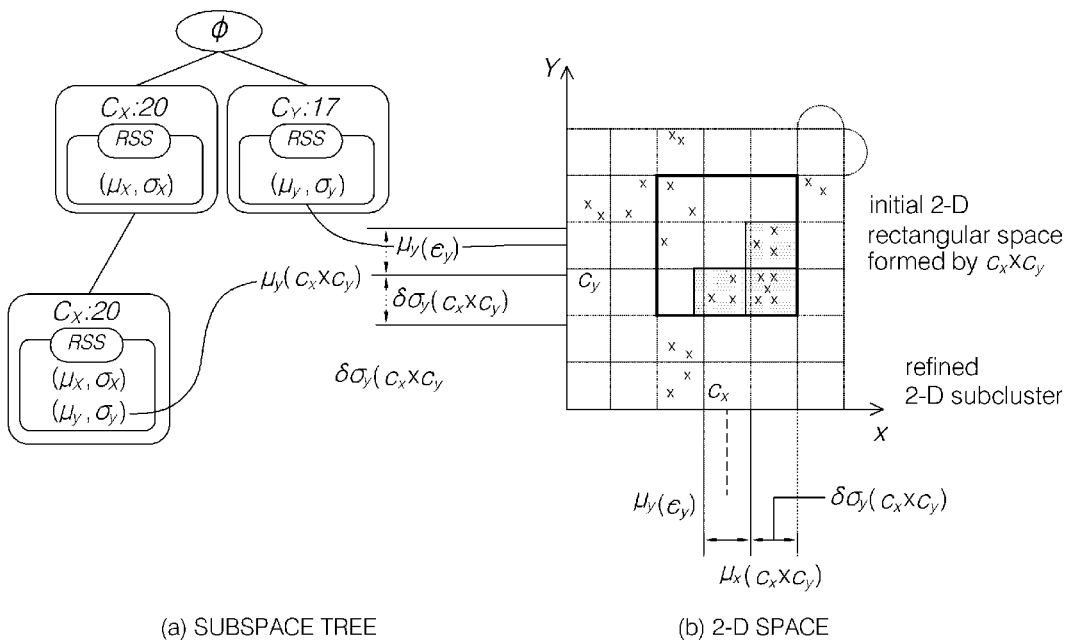
FIG. 8 illustrates how the refined range of 2-D subclusters according to the embodiments can be determined.

FIG. 8 illustrates how the refined range of the 2-D subcluster according to the embodiments can be determined. The rectangular space synopses of the two 1-D subclusters cx and cy are affected by the data elements that were not in the rectangular space cx×cy, respectively. Therefore, the data distribution of the data elements that were in the 2-D subcluster cx×cy is independently maintained as shown in FIG. 8-(a). As shown in FIG. 8-(b), the range of the 2-D subcluster can be refined more precisely according to the actual distribution of data elements in its range.

Figure 9:
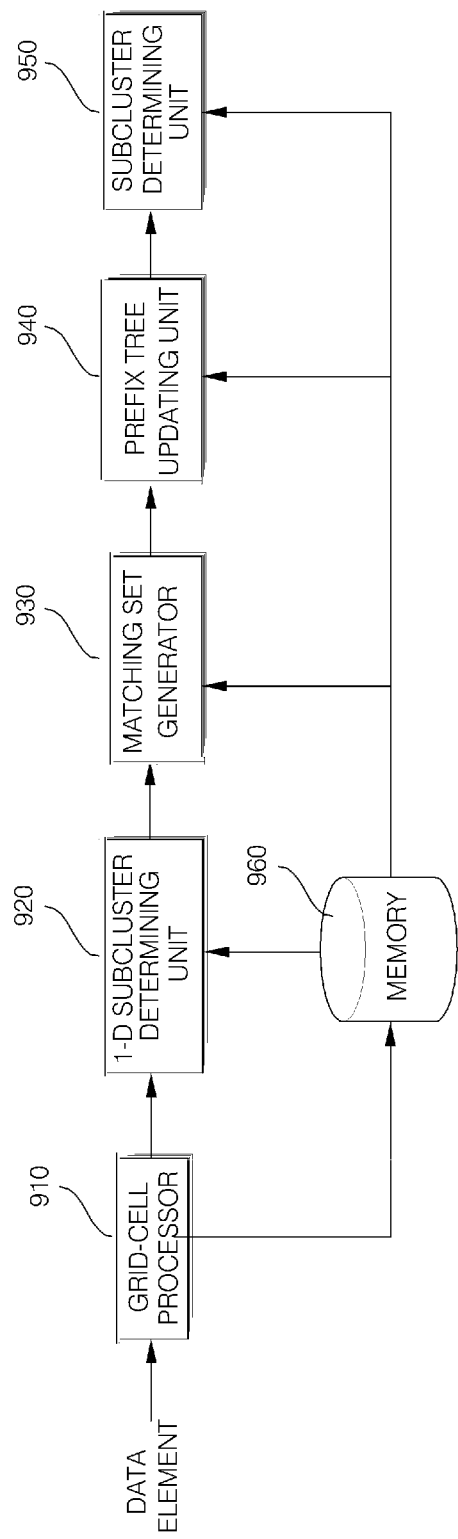
FIG. 9 is a block diagram of a system for clustering multi-dimensional data streams according to one embodiment of the present invention.

FIG. 9 is a block diagram of a system for clustering multi-dimensional data streams according to one embodiment of the present invention. The system for clustering multi-dimensional data streams according to the present embodiment is configured to include a grid-cell processor 910, a one-dimensional subcluster determining unit 920, a matching set generator 930, a prefix tree updating unit 940, a subcluster determining unit 950, and a memory 960.

The memory 960 stores the grid-cells so that the statistical distribution information of the previously generated data elements for each dimension composing the data space is managed using the grid-cells. Further, the memory 960 stores the sibling entries including the grid-cells and the sibling list having the structure where the sibling entries are linked and the statistical distribution information of the data elements is managed using these sibling entries and the sibling list together. The structure of the grid-cells, the sibling entries, and the sibling list, which are managed by the memory 960, has the same structure according to the foregoing description and therefore, the detailed description thereof will be described.

The grid-cell processor 910 receives the data elements from the external data stream and updates the statistical distribution of the grid-cells corresponding to the current generated data element among the grid-cells stored in the memory 960, such that it compares the occurrence count of the data element belonging to the corresponding grid-cell with the partitioning support, which is a predetermined value, to partition the grid-cell into the plurality of grid-cells according to the result and to process the grid-cells stored in the memory 960, such as an estimate of the statistical distribution of the partitioned grid-cells, etc. The operation of the grid-cell processor 910 is the same as the description of steps 310 to 345 shown in FIG. 3 and therefore, the detailed description thereof will be omitted.

The 1-D subcluster determining unit 920 determines the one-dimensional subclusters by using the grid-cells stored in the memory 960 and assigns the identifiers to the determined 1-D subclusters. In order to determine the 1-D subclusters, the 1-D subcluster determining unit 920 compares the occurrence count of the data elements belonging to the grid-cells for each dimension with the predetermined support $S_{min}$ to determine the 1-D subcluster according to the result. For example, the group of unit grid-cells or adjacent unit grid-cells where the support is larger than or equal to $S_{min}$ is determined to be the 1-D subcluster. The operation of the 1-D subcluster determining unit 920 is the same as the description of step 120 shown in FIG. 1 and therefore, the detailed description thereof will be described.

The matching set generator 930 receives the identifiers of the 1-D clusters determined in the 1-D subcluster determining unit 920 and generates a matching set that is a set of identifiers of the 1-D sub clusters where each dimensional value of the data elements falls in the range of the 1-D subclusters of the corresponding dimension. The operation of the matching set generator 930 is the same as the description of step 130 shown in FIG. 1 and therefore, the detailed description thereof will be described.

The memory 960 stores the prefix tree so that the identifiers of the subclusters belonging to the previously generated matching set by the matching set generator 930 are managed by the prefix tree and each node of the prefix tree has the occurrence count information of the data elements belonging to the data space corresponding to the corresponding node. The structure of the prefix tree stored in the memory 960 is the same as described in <Definition 5 A Subspace Tree (ST-tree)> and the detailed description thereof will be omitted.

The prefix tree updating unit 940 updates the prefix tree stored in the memory 960 according to the 1-D subcluster included in the matching set generated by the matching set generator 930. The operation of the prefix tree updating unit 940 is the same as the description of step 140 shown in FIG. 1 and therefore, the detailed description thereof will be described.

The subcluster determining unit 950 determines the subclusters by finding a set of frequently co-occurring 1-D subclusters among a set of 1-D subclusters belonging to the matching set generated by the matching set generator 930. At this time, the subcluster determining unit 950 finds a set of frequently co-occurring 1-D subclusters by comparing the support of the data space corresponding to each node of the prefix tree stored in the memory 960 with the predetermined support. Further, the subcluster determining unit 950 refines the range of the subcluster when the subcluster is determined and determines the predetermined interval to be the range of the subcluster based on the average of each dimensional value of the rectangular space synopsis.

The operation of the subcluster determining unit 950 is the same as the description of step 150 shown in FIG. 1 and the step of refining the range of the subcluster as described above and therefore, the detailed description thereof will be omitted.

Meanwhile, the foregoing embodiments of the present invention can be prepared by programs running in a computer and can be implemented by a general-purpose digital computer that runs the programs using a recording medium readable with the computer. The recording medium readable with the computer includes magnetic storage media (for example, ROM, floppy disk, hard disk, etc.), optical reading media (for example, CD-ROM, DVD, etc.), and storage media such as carrier wave (for example, transmission through Internet).

The spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:
1. A computer-implemented method for clustering multi-dimensional data streams, the method comprising:
receiving, by a grid-cell processor of a computer, data elements from an external data stream;
updating, by the grid-cell processor, grid-cells stored in memory of the computer based on the data elements, each grid-cell denoting statistical distribution information for data elements existing in a respective data space of the grid-cell;

determining, by a 1-D subcluster determining unit of the computer, 1-D subclusters using the grid-cells and assigning identifiers to the determined 1-D subclusters;

generating, by a matching set generator of the computer, a matching set that is a set of identifiers of the 1-D subclusters where each dimensional value of the data elements belongs in the range of the 1-D subclusters of the corresponding dimensions; and determining, by a subcluster determining unit of the computer, subclusters by finding a set of frequently co-occurring 1-D subclusters among the set of 1-D subclusters belonging to the generated matching set, thereby improving processing time and performance of the memory of the computer in finding the subclusters.

2. The computer-implemented method for clustering multi-dimensional data streams according to claim 1, wherein statistical distribution information of previously generated data elements for each dimension forming a data space is managed by using grid-cells, and wherein the determining-1-D-subclusters-and-assigning-identifiers step compares an occurrence count of a data element belonging to a grid-cell with a predetermined support for each dimension and determines the 1-D subcluster according to results of the comparing.

3. The computer-implemented method for clustering multi-dimensional data streams according to claim 1, wherein the identifiers of the 1-D subclusters belonging to the previously generated matching set are managed using a prefix tree and each node of the prefix tree has the occurrence count information of the data elements belonging to the data space corresponding to the node in question, wherein the clustering method further includes:
updating the prefix tree according to the 1-D subcluster included in the generated matching set, and
the determining subclusters step compares the support of the data space corresponding to each node of the prefix tree with the predetermined support to find a set of frequently co-occurring 1-D subclusters.

4. The computer-implemented method for clustering multi-dimensional data streams according to claim 1, wherein the matching set of the data elements $e^t = \langle e_1^t, e_2^t, \ldots, e_d^t \rangle$ in a d-dimensonal data space is defined by the following equation:

$$MS(e^t) = \{s | s \in C_j^t \text{ and } e_j^t \in s, 1 \leq j \leq d\}$$

wherein et denotes the set of data elements, etj denotes a data element with j being between 1 and d, $C_j^t$ denotes a set of 1-D subclusters in a jth dimension.

5. The computer-implemented method for clustering multi-dimensional data streams according to claim 3, wherein when a sequence of the dimensions for current data streams Dt of the d-dimensional data space $N = N_1 \times N_2 \times \ldots \times N_d$ is $N1 \to N2 \to \ldots \to Nd$, with Nj denoting a dimensional space j and j being between 1 and d, the prefix tree has a root node nroot having a "null" value and each node in a kth ($1 \leq k \leq d$) depth except for the root node is associated with an identifier c of the 1-D subcluster where the interval of the subcluster is $I_c$ in a domain of the corresponding dimension.

6. The computer-implemented method for clustering multi-dimensional data streams according to claim 5, wherein when a k-depth node v associated with the 1-D subcluster ck is given, $\rho = \text{root} \to c_1 \to c_2 \to \ldots c_{k-1} \to c_k$ denotes a sequence of the 1-D subclusters associated with the nodes in a path from the root to the node v and the dimension of the 1-D subclusters cj is Nj' ($1 \leq j \leq k$), the node v corresponds to a k-dimensional rectangular space whose range is defined by $\text{range}(v) = I_{c_1} \times I_{c_2} \times \ldots \times I_{c_k}$ in the k-dimensional subspace $S^k = N'_1 \times N'_2 \times \ldots N'_k (S^k \subset N)$, wherein cj denotes a 1-D subcluster j with j being between 1 and k, Icj denotes an interval of the 1-D subcluster cj, and N'j denotes the dimension of 1-D subcluster cj.

7. The computer-implemented method for clustering multi-dimensional data streams according to claim 5, wherein each node of the prefix tree except for the root node has the cluster identifier of the 1-D subcluster associated with the node v, the number of data elements in the range v, and information of the rectangular space in the range v.

8. The computer-implemented method for clustering multi-dimensional data streams according to claim 3, wherein the updating the prefix tree step includes updating the occurrence count information while traversing the nodes corresponding to the subsets of generated matching set in a depth-first manner.

9. The computer-implemented method for clustering multi-dimensional data streams according to claim 8, wherein updating the prefix tree step further includes comparing the updated support of the node with the significant support to remove the node and the child node from the prefix tree according to the comparison result.

10. The computer-implemented method for clustering multi-dimensional data streams according to claim 8, wherein the updating the prefix tree step further includes inserting a new node according to the generated matching set into the prefix tree while traversing the prefix tree.

11. The computer-implemented method for clustering multi-dimensional data streams according to claim 10, wherein the inserting-the-new-node step includes:
inserting the node corresponding to the 1-D subcluster into a first depth of the prefix tree when the generated matching set includes the 1-D subclusters that are not maintained in the prefix tree; and
inserting a new node corresponding to the multi-dimensional rectangular space according to the generated matching set.

12. The computer-implemented method for clustering multi-dimensional data streams according to claim 11, wherein the inserting-the-new-node-corresponding-to-the-multi-dimensional-rectangular-space step filters out the insignificant 1-D subclusters in the generated matching set and inserts a new node corresponding to (k+1)-dimensional rectangular space with a 1-D subcluster subsequent to a dimension of the 1-D subcluster whose dimension is associated with the node v among the 1-D subclusters of the filtered matching set when visiting the k-dept node v corresponding to the k-dimensional rectangular space R(v).

13. The computer-implemented method for clustering multi-dimensional data streams according to claim 12, wherein in the inserting-the-new-node-corresponding-to-the-(k+1)-dimensional-rectangular-space step, the new node is inserted according to a result generated by estimating the support of the new node and comparing the estimated support with the predetermined significant support.

14. The computer-implemented method for clustering multi-dimensional data streams according to claim 7, wherein the information of the rectangular space of the range v includes averages and standard deviations of each of the dimensional values of the data elements belonging to the rectangular space.

15. The computer-implemented method for clustering multi-dimensional data streams according to claim 14, further comprising determining a predetermined interval based on the averages of each of the dimensional values to be the range of the subcluster as a step of refining the range of the subcluster from the determined subcluster.

16. The computer-implemented method for clustering multi-dimensional data streams according to claim 15 wherein when the average and standard deviation of an ith dimension are $\mu i$ and $\sigma i$, the predetermined interval for the ith dimension is determined between $\mu i+\delta\sigma i$ and $\mu i-\delta\sigma i$ by using a user-defined value $\delta$.

17. A non-transitory computer readable medium including codes for running the method for clustering for multi-dimensional data streams claimed in claim 1.

18. A processor-based system for clustering multi-dimensional data streams, comprising:
   memory;
   a grid-cell processor that is configured to store grid-cells in the memory, receive data elements from an external data stream, and update the stored grid-cells based on the data elements, each grid-cell denoting statistical distribution information for data elements existing in a respective data space of the grid-cell;
   a 1-D subcluster determining unit, coupled to the memory, that is configured to determine 1-D subclusters using the grid-cells stored in the memory and assign identifiers to the determined 1-D subclusters;
   a matching set generating unit, coupled to the 1-D subcluster determining unit, that is configured to generate a matching set that is a set of identifiers of the 1-D subclusters where each dimensional value of the data elements belongs in the range of the 1-D subclusters of the corresponding dimensions; and
   a subcluster determining unit, coupled to the matching set generating unit, that is configured to determine subclusters by finding a set of frequently co-occurring 1-D subclusters among the sets of 1-D subclusters belonging to the generated matching set, thereby improving processing time and performance of the memory in finding the subclusters.

19. The processor-based system for clustering multi-dimensional data streams according to claim 18, wherein the memory stores the grid-cells so that statistical distribution information of previously generated data elements for each dimension forming a data space is managed using the grid-cells, and
   wherein the 1-D subcluster determining unit is configured to compare an occurrence count of a data element belonging to a grid-cell with a predetermined support for each dimension and determines the 1-D subcluster according to results of the comparing.

20. The processor-based system for clustering multi-dimensional data streams according to claim 18, wherein the memory stores a prefix tree so that the identifiers of the 1-D subclusters belonging to the previously generated matching set are managed using the prefix tree and each node of the prefix tree has the occurrence count information of the data elements belonging to the data space corresponding to the node in question; and wherein the system further comprises:
   a prefix tree updating unit, coupled to the matching set generating unit and the subcluster determining unit, that is configured to update the prefix tree according to the 1-D subcluster included in the generated matching set,
   wherein the subcluster determining unit is configured to compare the support of the data space corresponding to each node of the prefix tree with the predetermined support to find a set of frequently co-occurring 1-D subclusters.

21. The processor-based system for clustering multi-dimensional data streams according to claim 20, wherein when a sequence of the dimensions for current data streams Dt of the d-dimensional data space $N=N_1 \times N_2 \times \ldots \times N_d$ is $N1 \rightarrow N2 \rightarrow \ldots \rightarrow Nd$, with Nj denoting a dimensional space j and j being between 1 and d, the prefix tree has a root node nroot having a "null" value and each node in a kth ($1 \leq k \leq d$) depth except for the root node is associated with an identifier c of the 1-D subcluster where the interval of the subcluster is $I_c$ in a domain of the corresponding dimension.

22. The processor-based system for clustering multi-dimensional data streams according to claim 21, wherein when a k-depth node v associated with the 1-D subcluster ck is given, $\rho = root \rightarrow C_1 \rightarrow C_2 \rightarrow \ldots C_{k-1} \rightarrow C_k$ denotes a sequence of the 1-D subclusters associated with the nodes in a path from the root to the node v and the dimension of the 1-D subclusters cj is Nj' ($1 \leq j \leq K$) the node v corresponds to a k-dimensional rectangular space whose range is defined by $range(v) \times I_{c_1} \times I_{c_2} \times \ldots \times I_{c_k}$ in the k-dimensional subspace $S^k = N'_1 \times N'_2 \times \ldots N'_k (S^k \subseteq N)$, wherein cj denotes a 1-D subcluster j with j being between 1 and k, Icj denotes an interval of the 1-D subcluster cj, and N'j denotes the dimension of 1-D subcluster cj.

23. The processor-based system for clustering multi-dimensional data streams according to claim 22, wherein each node of the prefix tree except for the root node has the cluster identifier of the 1-D subcluster associated with the node v, the number of data elements in the range v, and information of the rectangular space in the range v.

24. The processor-based system for clustering multi-dimensional data streams according to claim 23, wherein the information of the rectangular space of the range v includes averages and standard deviations of each of the dimensional values of the data elements belonging to the rectangular space.

25. The processor-based system for clustering multi-dimensional data streams according to claim 24, wherein the subcluster determining unit is configured to refine the range of the subcluster from the determined subcluster and determine the predetermined interval based on the averages of each of the dimensional values to be the range of the subcluster.

26. The processor-based system for clustering clustering multi-dimensional data streams according to claim 25, wherein the subcluster determining unit is configured to determine the predetermined interval for an ith dimension to be between $\mu i+\delta\sigma i$ and $\mu i-\delta\sigma i$ by using a user-defined value $\delta$ when the average and standard deviation of ith dimension are $\mu i$ and $\sigma i$.

* * * * *